United States Patent [19]

Sacripante et al.

[11] Patent Number: 5,679,724
[45] Date of Patent: Oct. 21, 1997

[54] SUBMICRON PARTICLES FOR INK JET INKS

[75] Inventors: Guerino G. Sacripante; Raj D. Patel, both of Oakville; Marcel P. Breton, Mississauga; Michael A. Hopper, Toronto; Grazyna E. Kmiecik-Lawrynowicz, Ontario; Beng S. Ong, Mississauga, all of Canada

[73] Assignee: Xerox Corporation, Stamford, Conn.

[21] Appl. No.: 536,235

[22] Filed: Sep. 29, 1995

[51] Int. Cl.$^6$ .................... C08J 3/02; C08J 3/05
[52] U.S. Cl. .................... 523/161; 523/334; 523/335; 524/601; 524/603; 524/845; 528/487; 106/20 D
[58] Field of Search .................... 523/161, 334, 523/335; 524/601, 603, 845; 528/487; 107/20 D

[56] References Cited

U.S. PATENT DOCUMENTS

| | | | |
|---|---|---|---|
| 3,498,938 | 3/1970 | Grommers et al. | |
| 4,627,875 | 12/1986 | Kobayashi et al. | 106/22 |
| 4,628,071 | 12/1986 | Morgan | 524/832 |
| 4,665,107 | 5/1987 | Micale | 523/161 |
| 4,737,190 | 4/1988 | Shimada et al. | 106/22 |
| 4,910,236 | 3/1990 | Foye et al. | 523/334 |
| 4,946,891 | 8/1990 | Devona et al. | 524/833 |
| 4,997,864 | 3/1991 | Waters | 523/334 |
| 5,156,675 | 10/1992 | Breton et al. | 106/22 |
| 5,169,437 | 12/1992 | You | 106/20 D |
| 5,207,824 | 5/1993 | Moffatt et al. | 106/22 R |
| 5,348,832 | 9/1994 | Sacripante et al. | 430/109 |
| 5,364,462 | 11/1994 | Crystal et al. | 106/20 R |
| 5,482,812 | 1/1996 | Hopper et al. | 523/335 |

FOREIGN PATENT DOCUMENTS

| | | | |
|---|---|---|---|
| 1223074 | 10/1986 | Japan | 523/161 |

OTHER PUBLICATIONS

K.R. Barton, "Sulfopolyesters: New Resins For Water-Based Inks, Overprint Lacquers, and Primers," American Ink Maker, Oct. 1993, pp. 70–72.

*Primary Examiner*—Andrew E. C. Merriam
*Attorney, Agent, or Firm*—Oliff & Berridge

[57] ABSTRACT

An ink for ink jet printing includes an emulsifiable polymer resin and a pigment, and may be made by: (a) combining (1) an emulsion of an emulsifiable polymer resin in an anionic medium with (2) a pigment and a cationic surfactant; and (b) aggregating particles in the mixture of step (a) to a desired particle size, thereby producing a solution of aggregated particles. The particles can optionally be coalesced to alter the particle size of the particles.

15 Claims, No Drawings

SUBMICRON PARTICLES FOR INK JET INKS

BACKGROUND OF THE INVENTION

This invention relates to improved waterfast inks for use in ink jet printing processes. More particularly, this invention relates to a process for producing ink jet inks having excellent waterfastness and print quality characteristics that can be used in various printing processes such as thermal ink jet and acoustic ink jet processes.

Ink jet printing processes and apparatus for such processes are well known in the art. Two major types of ink jet processes are thermal ink jet and acoustic or piezoelectric ink jet processes.

In thermal ink jet printing processes, the printer typically employs a resistor element in a chamber provided with an opening for ink to enter from a plenum. The plenum is connected to a reservoir for storing the ink. A plurality of such resistor elements is generally arranged in a particular pattern, called a primitive, in a printhead. Each resistor element is associated with a nozzle in a nozzle plate, through which ink is expelled toward a print medium, such as paper. The entire assembly of printhead and reservoirs comprises an ink jet pen. In operation, each resistor element is connected via a conductive trace to a microprocessor, where current-carrying signals cause one or more selected elements to heat up. The heating creates a bubble of ink in the chamber, which is expelled through the nozzle toward the print medium. In this way, firing of a plurality of such resistor elements in a particular order in a given primitive forms alpha numeric characters, performs areafill, and provides other print capabilities on the medium. The thermal ink jet printing process is described in more detail, for example, in U.S. Pat. Nos. 5,169,437 to You and 5,207,824 to Moffatt et al., the entire disclosures of which are incorporated herein by reference.

In an acoustic or piezoelectric ink jet system, ink droplets are propelled to the recording medium by means of a piezoelectric oscillator. In such a system, a recording signal is applied to a recording head containing the piezoelectric oscillator, causing droplets of the ink to be generated and subsequently expelled through the printhead in response to the recording signal to generate an image on the recording medium. In this printing system, a recording signal is converted into a pulse by a signal processing means such as a pulse converter and then applied to the piezoelectric oscillator. A change in pressure on the ink within an ink chamber in the printhead caused by the recording signal results in droplets of ink being ejected through an orifice to a recording medium. Such an ink jet system is described in more detail, for example, in U.S. Pat. No. 4,627,875 to Kobayashi et al., the entire disclosure of which is incorporated herein by reference.

In these and other ink jet recording processes, it is necessary that the ink being used meet various stringent performance characteristics. Such performance characteristics are generally more stringent than those for other liquid ink applications, such as for writing instruments (e.g., a fountain pen, felt pen, etc.). In particular, the following conditions are generally required for inks utilized in ink jet printing processes:

(1) the ink should possess liquid properties such as viscosity, surface tension and electric conductivity matching the discharging conditions of the printing apparatus, such as the driving voltage and driving frequency of a piezoelectric electric oscillator, the form and material of printhead orifices, the diameter of orifices, etc.

(2) the ink should be capable of being stored for a long period of time without causing clogging of printhead orifices during use.

(3) the recording liquid should be quickly fixable onto recording media, such as paper, film, etc., such that the outlines of the resulting ink dots are smooth and there is minimal blotting of the dotted ink.

(4) the resultant ink image should be of high quality, such as having a clear color tone and high density. The ink image should also have high gloss and high color gamut.

(5) the resultant ink image should exhibit excellent waterfastness (water resistance) and lightfastness (light resistance).

(6) the ink should not chemically attack, corrode or erode surrounding materials such as the ink storage container, printhead components, orifices, etc.

(7) the ink should not have an unpleasant odor and should not be toxic or inflammable.

(8) the ink should exhibit low foaming and high pH stability characteristics.

Various inks for ink jet printing processes are known in the art. For example, various ink jet inks are disclosed in U.S. Pat. Nos. 4,737,190 to Shimada et al. and U.S. Pat. No. 5,156,675 to Breton et al. Generally, the ink jet inks of the prior art are aqueous inks, comprising a major amount of water, a humectant and/or a co-solvent, and a dye. By selecting specific humectants, dyes, or other components, it is possible to adjust the print characteristics of the resultant ink.

U.S. Pat. No. 5,364,462 to Crystal et al. describes dye-based inks that are described as providing improved stability, jetting characteristics, solubility and waterfastness. The aqueous dye-based ink includes a dye and a hydroxyethylated polyethylene imine polymer. The hydroxyethylated polyethylene imine polymer may also be substituted with hydroxypropylated polyethylene imine or epichlorohydrin-modified polyethylene imine polymers. Aprotic solvents, such as dimethyl sulfoxide and tetramethylene sulfone may also be added to the ink to improve the solubility and stability of the dye solution.

Sulfopolyester resins are known and are generally available commercially from Eastek inks, a business unit of Eastman Chemical Company. These sulfopolyester resins are suitable for use in water-based inks, overprint lacquers and primers, as described in Kenneth R. Barton, "Sulfopolyesters: New Resins for Water-Based Inks, Overprint Lacquers and Primers," *American ink Maker*, pp. 70–72 (October, 1993). The sulfopolyester resins may be prepared by the polycondensation reaction of selected dicarboxylic acids, glycols and sodio sulfoorganodicarboxylic acids or glycols to produce linear structures.

Emulsion polymerization processes, both batch and starve fed, are known in the art. The processes are typically used for the preparation of latexes and to polymerize monomers to form polymer resins for use in, for example, toners for dry image development systems. Variants of starve fed emulsion polymerization processes have been applied most widely in the preparation of latexes. For example, U.S. Pat. Nos. 4,946,891 and 3,498,938 disclose processes for preparing latexes useful, for example, in paints.

As a further example, U.S. Pat. No. 4,628,071 discloses a semicontinuous emulsion copolymerization process for producing a polymer of vinyl and acrylate monomers. The process involves the semicontinuous starved feed of a mixture of the monomers to a reactor containing a precharge of an acrylic acid monomer. The polymers are disclosed as useful in inks, floor finishes, coatings and adhesives.

An improved starve fed emulsion polymerization process, which allows for the independent control of both the molecular weight and the molecular weight distribution of the resultant toner resin, is disclosed in U.S. Pat. No. 5,444,140. The simultaneous control of the molecular weight and the molecular weight distribution is accomplished by using a starve fed emulsion polymerization process comprising: (a) selecting a desired molecular weight and molecular weight distribution of the polymer resin; (b) determining a starve fed fraction of less than 1 but more than zero that will achieve the molecular weight and molecular weight distribution; and (c) charging a reaction vessel with a chain transfer agent and a first monomer emulsion, and polymerizing monomer in the first monomer emulsion while simultaneously adding to the reactor vessel additional monomer in the form of a second monomer emulsion, and additional chain transfer agent.

Although numerous ink jet inks are presently available, they generally do not meet all of the above-described requirements, while also providing excellent print quality on plain paper. In particular, the inks generally used in ink jet printing processes, while producing acceptable print quality, do not produce the high print quality that is achieved by using dry toner compositions, such as in electrostatographic imaging processes.

The need continues to exist in the ink jet industry for improved ink jet inks, and processes for producing the same, that satisfy the above-described requirements while providing high quality prints on a wide variety of recording media, including plain paper. Although some currently available ink jet inks may provide waterfast images with better substrate latitude, the inks are unacceptable in that they generally smear and have poor latency and maintainability characteristics. In addition, such inks are generally difficult to manufacture. Thus, there is still a need in the ink jet ink industry for improved black and colored inks that can be easily prepared and obtained at a lower cost.

SUMMARY OF THE INVENTION

The present invention provides processes for producing ink jet ink compositions that have excellent waterfastness and high print quality on a wide variety of print media, including paper and transparencies. Ink compositions prepared by processes of the present invention also meet end-user requirements described above, including wide color gamut, high gloss, lightfastness, high stability, improved drying time and reduced odor retention and toxicity while being compatible with the ink jet printing environment and apparatus. Ink jet ink compositions prepared by processes of the present invention also provide significantly improved print quality on plain paper, as compared to other ink compositions. Significantly, the present invention provides ink compositions having improved adhesion of pigments on print media while allowing for a higher loading of colorant in the ink than was previously possible.

The present inventors have discovered that an ink composition may be formulated by combining (1) a resin emulsion of an emulsifiable polymer and an anionic surfactant, and (2) a dispersion of a pigment and a cationic surfactant, followed by aggregating and coalescencing resultant pigmented polymer particles. Optionally, the particle size may be altered during the coalescence step, if desired. In embodiments, the resin emulsion may be separately formed or may be formed in situ from an emulsion/aggregation process used to form the emulsifiable polymer resin. Such ink compositions produce improved print quality while allowing specific control of the particle size.

Specifically, this invention provides a method for forming an ink jet ink composition, comprising:

(a) combining (1) an emulsion of an emulsifiable polymer resin in an anionic medium with (2) a pigment and a cationic surfactant;

(b) aggregating particles in the mixture of step (a) to a desired particle size, thereby producing a dispersion of aggregated particles; and (c) optionally coalescing said aggregated particles.

The present invention thus provides ink jet ink compositions containing colored particles having a number average particle size of from about 5 nm to about 500 nm, and a process for producing the same.

DETAILED DESCRIPTION OF PREFERRED EMBODIMENTS

The ink jet ink compositions of the present invention generally comprise a liquid vehicle and an emulsifiable polymer resin with a pigment dispersed in the polymer resin. The ink compositions are generally formed by combining (1) an emulsifiable polymer resin emulsion in an anionic medium with (2) a pigment dispersion in a cationic surfactant, aggregating the polymer resin to a desired particle size, and optionally coalescencing the particles. By emulsifiable polymer resin, it is meant that the polymer resin spontaneously emulsifies to a submicron size regime upon heating the polymer resin to above its glass transition temperature, in a solvent such as water. In the present invention, the emulsifiable polymer resin may include a base resin (polymer chain) with hydrophilic groups attached thereto. The hydrophilic groups In the polymer control the emulsifying characteristics of the resin, and render the polymer resin emulsifiable in a solvent such as water. The emulsifiable polymer resin may also comprise any of the various polymer materials traditionally used in the electrostatographic imaging art for forming dry toner and developer compositions, wherein the polymer is capable of emulsifying to submicron sized particles in a solvent.

When a toner resin is used in embodiments of the present invention, the toner resin may be any of the polymer resins typically used for preparing toner and developer compositions. For example, the toner resin may include, but is not limited to, styrene and derivatives thereof, butadiene and derivatives thereof, isoprene and derivatives thereof, mixtures thereof and the like. Preferred are such resins as styrene/butadiene, styrene/butylacrylate, styrene/butylmethacrylate, polyester and the like.

For use in the ink jet inks of the present invention, the base resin of the emulsifiable polymer resin may include any suitable polymers, such as polyamides, polyimides, poly(meth)acrylate, polystyrene, copolystyrenecopoly(meth)acrylate, polyester, mixtures thereof and the like. Preferably, the base resin of the emulsifiable polymer resin comprises polyester. Other known resins may be used for the base resin for the emulsifiable polymer resin in embodiments of the present invention, so long as the objects of the present invention are achieved and the above-described conditions for ink jet printing are satisfied. In addition, the base resin for use in the emulsifiable polymer resin of inks of the present invention is selected to meet three requirements: 1) the resin must be compatible with cosolvents used in the inks; 2) the resin must be sufficiently thermally stable to avoid decomposition of the polymer resin on heaters used in the printhead ejectors, for example, to prevent kogation and poor heater efficiency; and 3) the resin must be stable with respect to possible hydrolysis of the polymers used in the ink. Furthermore, the base resin used in the emulsifiable polymer resin of the present invention must not be soluble, without the hydrophilic groups, in the aqueous medium used for the ink.

The emulsifiable polymer resin used in the ink jet inks of the present invention preferably also includes a hydrophilic group attached to the base resin polymer chain. The hydrophilic group is included to render the polymer resin emulsifiable in water or another solvent. Any suitable hydrophilic group may be attached to the base resin polymer chain to render the resultant polymer emulsifiable in a solvent, so long as the objects of the present invention are achieved. Examples of suitable hydrophilic groups include, but are not limited to, carboxylic acid alkali salts, phosphonate salts, ammonium halides, alkali sulfonated groups, mixtures thereof and the like. Preferably, the hydrophilic group attached to the base resin polymer chain is an alkali sulfonated group with an alkali metal counterion such as sodium, calcium, lithium, potassium, cesium, barium, magnesium, hydrogen, mixtures thereof and the like.

In embodiments of the present invention, the final particle size of the emulsified polymer compound may generally be controlled by adjusting the concentration of hydrophilic groups attached to the base resin polymer chain. For example, as the concentration of hydrophilic groups increases, the polymer resin emulsifies to smaller sized particles; and at high enough concentration of hydrophilic groups, for example greater than 10 mole % of the resin, the resin becomes soluble in the liquid. In contrast, as the concentration of hydrophilic groups decreases, the polymer resin increases in particle size when emulsified in the liquid; and if the concentration of the hydrophilic group is too low, for example, less than 2.5 mole % of the resin, the corresponding particles may have a particle size greater than 500 nm and may not be useful as an ink component. Therefore, if the concentration of the hydrophilic groups becomes too high or too low, the ability of the polymer resin to self-emulsify to submicrons particle sizes of from about 2 nm to about 500 nm is decreased. Accordingly, in the emulsifiable polymer resin of the present invention, hydrophilic groups are attached to the base resin polymer chain in an amount sufficient to enable the emulsifiable polymer resin to self-emulsify to a desired submicron particle size. Preferably, the concentration of hydrophilic groups is from about 2.5 mole % to about 15 mole % of the resin, and more preferably it is from about 5 mole % to about 10 mole % of the resin.

In embodiments of the present invention, the emulsifiable polymer resin is preferably a polyester derived from a diol and a diester. In a preferred emulsifiable polymer resin, the resin comprises about 50 mole percent of a diol such as an alkylene glycol or oxyalkylene glycol, and about 50 mole percent of a diester. The diester component in the preferred emulsifiable polymer resin is preferably a mixture of from about 2.5 to about 15 mole percent of sulfonated aromatic moiety, preferably a sodium sulfonated aromatic moiety, such as dimethyl 5-sulfoisophthalate sodium salt, and the remaining portion is from about 35 to about 47.5 mole percent of a diester such as dimethyl terephthalate, dimethyl naphthalenedicarboxylate, dimethyl isophthalate, mixtures thereof and the like. Such an emulsifiable polymer resin of this embodiment may have repeating units of the following general formula:

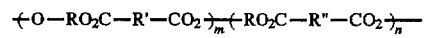

wherein R' is phenylene, ethenylene, terephthalylene, isophthalylene, bisphenolene, bis(alkyloxy) bisphenolene, cyclohexylene, an alkylene group or the like; R" is an alkali sulfonate derivative of phenylene, ethenylene, terephthalylene, isophthalylene, bisphenolene, bis(alkyloxy (bisphenolene, cyclohexylene, alkylene group, mixtures thereof, derivatives thereof and the like; R is an alkyl group or an oxyalkylene group; and n and m represent the random segments of the polymer and are integers of from 1 to about 300 each. The molecular weight of said emulsifiable resin may be from about 500 to about 50,000 and preferably from about 1,000 to about 20,000. More preferably, the molecular weight is from about 1,000 to about 5,000. Additional suitable emulsifiable polyester resins are described, for example, in U.S. Pat. No. 5,348,832, the entire disclosure of which is incorporated herein by reference.

In embodiments of the present invention, the emulsifiable polymer resin may also comprise any of the polymer resins traditionally employed in the formation of toner particles, such as are used in electrostatographic imaging processes. Such toner resins may be used as the emulsifiable polymer resin in the ink compositions of the present invention so long as the toner resins emulsify to submicron sizes, as described herein.

In embodiments of the present invention, the emulsifiable polymer resin preferably has a glass transition temperature of from about 10° C. to about 100° C., and more preferably of from about 20° C. to about 80° C. Most preferably, the glass transition temperature is from about 35° C. to about 80° C. The emulsification of the polymer is usually accomplished at a temperature above its glass transition temperature in a liquid media. Hence, if the glass transition temperature of the polymer is above 100° C., then the polymer may not self-emulsify in water at atmospheric pressure. Conversely, if the glass transition temperature of the polymer is too low, then the resultant print media may become very sticky.

Various methods for producing such emulsifiable polymer resins are known in the art, and will be apparent to one skilled in the art based on the instant disclosure. For example, sulfonated polyester resins are available from Eastek Inks, a business unit of Eastman Chemical Company, as the Sulfopolyester Series 1000, 1100, 1200 and 2100 products. Such sulfopolyester resins, and the method for production thereof, are described, for example, in Kenneth R. Barton, "Sulfopolyesters: New Resins for Water-Based Inks, Overprint Lacquers and Primers," *American Ink Maker*, pp. 70–72 (October, 1993), the entire disclosure of which is incorporated herein by reference. The disclosed process may be adjusted as necessary, in accordance with the present invention, to provide suitable emulsifiable polyester resins.

The ink jet inks of the present invention also contain a pigment, with the pigment being mixed with and dispersed in the emulsifiable polymer resin or chemically attached to the polymer resin. That is, in embodiments, the pigment may simply be dispersed in the polymer resin, whereby the polymer resin coats the pigment, or the pigment may be chemically incorporated into the polymer matrix.

The colorant for the ink jet ink compositions of the present invention may be a pigment, or a mixture of one or more pigments. The pigment may be black, cyan, magenta, yellow, red, blue, green, brown, mixtures thereof, and the like. Examples of suitable black pigments include various carbon blacks such as channel black, furnace black, lamp black, and the like, such as Levanyl Black A-SF (Miles, Bayer) and Sunsperse Carbon Black LHD 9303 (Sun Chemicals). Colored pigments include red, green, blue, brown, magenta, cyan, and yellow particles, as well as mixtures thereof. Illustrative examples of magenta pigments include 2,9-dimethylsubstituted quinacridone and anthraquinone, identified in the Color Index as CI 60710, CI Dispersed Red 15, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue Xo2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 I((BASF), Paliotol Yellow 1840 (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected.

Preferably, in embodiments of the present invention where pigments are used, the pigment particle size is as small as possible to enable a stable dispersion of the particles in the emulsifiable polymer resin and to prevent clogging of the ink channels when the ink is used in an ink jet printer. Preferred particle average diameters are generally from about 0.001 to about 1 micron. More preferably, the particle average diameter of the pigment particles are from about 0.1 to about 1 micron. The particle size may depend, of course, upon the desired toner particle size and on the color characteristics of the particular pigment.

The pigment may be present in the ink jet ink compositions of the present invention in any effective amount to impart the desired colorant properties to the ink. Typically, the ink comprises from about 5 to about 400 percent by weight pigment by weight of the emulsifiable polymer resin. Preferably, the ink contains from about 10 to about 250 percent by weight and even more preferably from about 20 to about 150 percent by weight pigment by weight of the emulsifiable polymer. However, weight percent pigment outside of these ranges is permissible as long as the objects of the invention are achieved. A mixture of pigments in the proportions desired to obtain a specific shade may also be employed.

In the present invention, the ink jet ink composition is formed by combining (1) a latex of the emulsifiable polymer resin and an anionic surfactant with (2) a mixture of a pigment and a cationic surfactant; aggregating the particles in the resultant mixture; and optionally adjusting the particle size in a coalescence step. The result is submicron sized pigmented particles for the ink composition. This process will now be described in more detail.

A first step of the process comprises forming an anionic latex of the emulsifiable polymer. In this step, the anionic latex may be formed, for example, by mixing the emulsifiable polymer with a suitable anionic surfactant. Alternatively, the anionic latex may be formed by directly using the anionically-charged latex resulting from, for example, an emulsion polymerization process used to form the emulsifiable polymer resin.

In forming the anionic latex, any of the various surfactants known in the art may be mixed with the emulsifiable polymer resin such as to produce sufficient emulsification and dispersion of the emulsifiable polymer resin. For example, suitable surfactants selected for use in the present invention may include, but are not limited to, alkyl sulfonates, alkyl aryl sulfonates, condensed naphthalene sulfonates, alkyl sulfates, ethoxylated sulfates, phosphate esters, esters of sulfosuccinic acid, mixtures thereof and the like. Representative of these surfactants are sodium alpha-olefin ($C_{14}$–$C_{16}$) sulfonates; alkali metal or ammonium dodecylbenzene sulfonate; disodium dodecyl diphenyloxide disulfonate; disodium palmityl diphenyloxide disulfonate; sodium, potassium or ammonium linear alkyl benzene sulfonate; sodium lauryl sulfate; ammonium alkyl phenolethoxylate sulfate; ammonium or sodium lauryl ether sulfate; ammonium alkyl ether sulfate; sodium alkyl ether sulfate; sodium dihexyl sulfosuccinate; sodium dicyclohexylsulfosuccinate; sodium diamyl sulfosuccinate; sodium diisobutylsulfosuccinate; disodium ethoxylated nonyl phenol half ester of sulfosuccinic acid; tetra sodium N-(1,2-dicarboxyethyl)-N-octadecyl sulfosuccinate; disodium isodecyl sulfosuccinate; sodium bistridecyl sulfosuccinate; sodium salt of alkyl aryl polyether sulfate; lauryl alcohol ether sulfate; sodium salt of condensed naphthalene sulfonic acid; complex phosphate ester of ethylene oxide adduct; mixtures thereof and the like. Preferred surfactants are those that have a relatively low molecular weight and high water solubility to facilitate removal, if desired.

The anionic latex is blended with a mixture of the pigment and a cationic surfactant, and optionally with additional water. Any of the various cationic surfactants known in the art may be mixed with the pigment in the process of the present invention. Examples of suitable cationic surfactants include, but are not limited to, alkylated ammonium compounds.

With the combination of the pigment and cationic surfactant and the anionic latex, a controlled aggregation of the emulsifiable polymer resin and pigment occurs. In embodiments of the present invention, the aggregation step may yield pigmented resin particles, comprising the emulsifiable polymer resin and the pigment, within the desired particle size range for the final ink jet ink composition. For example, the aggregation step may yield pigmented particles having a particle size of from about 100 to about 500 nanometers, and preferably from about 100 to about 300 nanometers. However, in other embodiments of the present invention, the aggregation step may yield pigmented particles of a larger size, for example, of from about 3 to about 6 microns, that may be reduced in size in a subsequent step. That is, the coalescence step may, in embodiments, be used to reduce the average particle size of the pigmented particles from greater than 1 micron to less than 1 micron, while retaining the pigmentation of the particle. In all of these embodiments, however, an aspect of the process of the present invention, and particularly of the aggregation and coalescence steps, is that the resultant pigmented particles have a narrow size distribution.

The aggregation step may be conducted at any desired temperature for an amount of time sufficient for the components of the latex mixture to aggregate into particles of the desired particle size. Preferably, in embodiments of the present invention, the aggregation step is conducted at a temperature of from room temperature to about 100° C. Even more preferably, the aggregation step is conducted at a temperature of from room temperature to about 50° C. Although the time for the aggregation step may vary depending upon the specific components utilized, the aggregation step generally may be completed over a period of time of from about 10 minutes to about 5 hours.

If desired, an optional coalescence step may be conducted following the aggregation step. The coalescence step may be conducted, for example, to adjust the particle size of the pigmented particles to a preferred particle size for the final ink jet ink compositions. For example, where the aggregation step yields pigmented particles having a particle size of greater than 1 micron, the coalescence step may be conducted to reduce the particle size to a submicron regime. In an embodiment of the present invention, the coalescence step may be conducted by adding a further amount of an anionic surfactant to the solution resulting from the aggregation step, and heating the solution. In this embodiment, the further anionic surfactant may be the same as or different from the anionic surfactant used to form the anionic latex, and may, if desired, be selected from the anionic surfactants identified above. The heating is preferably conducted at a temperature above room temperature, and up to about 120° C.

In another embodiment of the present invention, the pH of the solution resulting from the aggregation step is adjusted prior to the above-described coalescence step. In this embodiment, the pH of the solution is adjusted by adding any suitable pH controlling agent to the solution, to achieve a pH of between about 7 and about 10. It has been found that a solution whose particle size would not otherwise change during the above-described coalescence step, when adjusted to be an alkaline solution, undergoes a particle size reduction at the elevated temperatures of the coalescence step. Furthermore, in both embodiments of the coalescence step described above, although the particle size is reduced, the pigment remains part of the submicron particles and a narrow size distribution of the pigmented particles is maintained.

As will be apparent to one skilled in the art based upon the instant disclosure, the particle size of the pigmented particles may be adjusted to the desired range for the ink jet ink compositions by modifications to the above-described process. For example, the desired particle size may be obtained by altering such aspects of the process as the type and concentration of anionic surfactant used to form the anionic latex, the quantities of components used to form the pigment-cationic surfactant-latex solution, or the manner in which the various components are introduced into the polymerization process for forming the emulsifiable polymer resin. Alternatively, a micro fluidizer or other similar apparatus may be used to ensure that micron or submicron size particles with a narrow size distribution result.

In embodiments, the resultant mixture from the above-described process may be directly used as the final ink jet ink composition. Alternatively, in other embodiments, the pigmented particles may be separated and optionally dried, and then redispersed in a suitable solvent to form the ink composition. In each of these embodiments, the pigmented particles of the final ink jet ink composition are emulsified in a suitable solvent, such as water and/or a co-solvent, to emulsify the resin, thereby producing colored particulates having a desired particle size suitable for ink jet ink applications. Generally, in embodiments, the ink jet ink composition contains from about 2 to about 50% by weight of the pigmented particles in the solvent.

The result is a stable, homogeneous ink jet ink composition containing colored particulates having a number average particle size of from about 2 nm to about 500 nm, wherein the colored particulates comprise pigment and emulsifiable polymer resin. Preferably, the particle size of the colored particles in the ink jet ink composition is from about 5 nm to about 300 nm, and even more preferably from about 5 nm to about 100 nm.

The liquid vehicle of the inks of the present invention may consist of water, or a co-solvent may also be added to the water vehicle, if desired. For example, the solution of anionic and cationic surfactants in which the ink composition is formed may directly form a major proportion of the ink vehicle. In embodiments of the present invention, however, it is preferred that water be used alone as the solvent in the ink vehicle. This allows for the preparation of co-solvent-less inks, which are more environmentally friendly. The use of one or more co-solvents is therefore optional.

When a co-solvent is used, it is preferred that the co-solvent is a miscible organic component. Examples of suitable co-solvents include, but are not limited to, ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides. sulfoxides such as dimethyl sulfoxide, lactones, mixtures thereof and the like.

When mixtures of water and one or more co-solvents are selected as the liquid vehicle, the ratio of water to co-solvent may be in any effective range. Typically the ratio of water to co-solvent is from about 100:0 to about 30:70, preferably from about 97:3 to about 50:50, although the ratio can be outside these ranges. The non-water component of the liquid vehicle, when present, generally serves as a humectant, which typically has a boiling point higher than that of water.

Humectants may also be added to the inks of the present invention. For example, suitable humectants include, but are not limited to. glycols, N-methyl-pyrrolidone, 2-pyrrolidone, N-methyl-2-pyrrolidone, 1,2,-dimethyl-2-imidazolidinone, mixtures thereof and the like. Humectants may be included in the ink to prevent water evaporation and sedimentation. Additionally, certain humectants such as N-methyl-pyrrolidone and 2-pyrrolidone have been found to improve solubility in the ink and thus serve the dual role as humectant and co-solvent. In addition, some humectants such as 2-pyrrolidone have been found to resist ink build-up on jet faces during extended printing, which is preferred for cartridge refillability. When incorporated into the inks of the present invention, approximately 1 to 10 percent of one or more humectants by weight may be added to the ink to prevent sediment build-up on print heads.

Other components may also be incorporated into the inks of the present invention. For example, inks of the present invention may include such additives as biocides, buffering agents, anti-mold agents, pH adjustment agents, electric conductivity adjustment agents, chelating agents, anti-rusting agents, and the like. Such additives may be included in the ink jet inks of the present invention in any effective amount, as desired. For example, such additives may be included in an amount ranging from about 0.0001 to about 4.0 percent by weight, and preferably from about 0.01 to about 2.0 percent by weight of the ink. More preferably, such additives may be included in an amount ranging from about 0.01 to about 0.5 percent by weight of the ink and most preferably from about 0.05 to about 0.3 percent by weight. The amount included will depend, of course, on the specific component being included.

Examples of buffering agents include, but are not limited to, agents such as sodium borate, sodium hydrogen phosphate, sodium dihydrogen phosphate, mixtures thereof and the like. Examples of biocides include, but are not limited to, Dowicil™ 150, 200, and 75; benzoate salts; sorbate salts; mixtures thereof and the like.

Additional pH controlling agents may also be included in the ink, if desired. Examples of such pH controlling agents suitable for inks of the present invention include, but are not limited to, acids; bases, including hydroxides of alkali metals such as lithium hydroxide, sodium hydroxide and potassium hydroxide; phosphate salts; carbonate salts; carboxylate salts; sulfite salts; amine salts; amines such as diethanolamine and triethanolamine; mixtures thereof and the like. When present, the pH controlling agent is preferably included in an amount of up to about 1 percent by weight, and preferably from about 0.01 to about 1 percent by weight.

Other additives may also be added. For example, trimethylol propane may be added to the ink jet ink compositions, for example, to reduce paper curl or as an anti-cockle agent. These additives, such as trimethylol propane, generally have a solubility parameter in the range of from about 27 to about 35 MPa$^{1/2}$, and preferably between 29 and 33 MPa$^{1/2}$, and can bind to paper through hydrogen bonding. Other examples of such anti-curl agents include, but are not limited to, N-acetylethanolamine, N-N-diacetyl piperazine, triethylene glycol, N-(2aminoethyl) ethanolamine, 1,4-butanediol, N-ethyl formamide, 2-methyl-1,5-pentanediol, 1,5-pentanediol, diethylene glycol, 2,2'-oxybisethanol, mixtures thereof and the like. Preferably, the concentration of such anti-curl agents in ink jet inks of the present invention is between about 5 and about 50% by weight and more preferably between about 10 and about 30% by weight.

Other suitable additives are disclosed, for example, in U.S. Pat. No. 4,737,190 to Shimada et al., the entire disclosure of which is incorporated herein by reference.

Preferably, in embodiments of the present invention, the ink composition and especially the pigmented particles contained therein are neutrally charged. Thus in embodiments, charge control agents and the like may be added (or excluded) as necessary to neutralize any charge in the ink composition that arises from the presence of other components.

In forming the final ink jet ink compositions of the present invention, certain physical properties should be satisfied. For example, ink compositions for use in ink jet recording processes should have appropriate viscosity and surface tension characteristics. In the present invention, it is preferred that the ink jet ink composition has a viscosity of from about 0.7 to about 15 cP at 25° C. More preferably, the viscosity is from about 1 to about 10 cP, and even more preferably from about 1 to about 5 cP. It is also preferred that the ink jet ink composition has a surface tension of from about 20 to about 70 dynes/cm at 25° C. More preferably, the surface tension is from about 25 to about 60 dynes/cm, and even more preferably from about 30 to about 40 dynes/cm.

The invention will now be described in detail with reference to specific preferred embodiments thereof. All parts and percentages are by weight unless otherwise indicated.

EXAMPLES

Example 1

Preparation of a Sulfonated Polyester Emulsifiable Polymer Resin

A sulfonated polyester resin is prepared in a 1 L Parr reactor equipped with a magnetic stirrer, distillation apparatus, and a bottom drain valve. Into the reactor is charged 172 g dimethylterephthalate, 141 g 1,2-propanediol, 29.6 g dimethyl 5-sulfoisophthalate sodium salt, and 0.5 g of burtyltin oxide hydroxide (commercially available from Elf Atochem as FASCAT). The mixture is heated in the reactor to 165° C. and stirred at 200 rpm for one hour. The mixture is then raised slowly to 190° C. over a five hour period, during which time methanol is collected in the distillation receiver. The mixture is then heated to 200° C. and vacuum is applied from atmospheric pressure to 1 torr over a two hour period, during which time 1,2-propanediol is collected in the distillation receiver. 75 g 1,2propanediol is collected during this process. The temperature is then raised slowly to 220° C., and the vacuum decreased to 0.2 torr over a one hour period. The reactor is then repressurized to atmospheric pressure, and the product is charged through the bottom drain valve. The sulfonated polyester resin is analyzed for its glass transition temperature, which is found to be 31° C.

Example 2

Preparation of a Cyan Colored Ink Jet Ink Composition

A cyan ink jet ink composition is prepared by first mixing 1 g of pre-dispersed Sunsperse Blue BHD 6000 (45.3% solids, available from Sun Chemicals), 0.15 g of the cationic surfactant alkylbenzyldimethyl ammonium chloride (Sanizol B available from Kao Corp.) and 80 g water. The pigment/surfactant mixture is first stirred, and then homogenized at 4000 rpm using a polytron. While the solution is being homogenized, 10 g of the sulfonated polyester resin of Example 1 (35% solids) is added to the mixture. The resultant mixture is homogenized for a period of 1 to 2 minutes. The result is a cyan colored sulfonated polyester based ink.

The ink composition is tested for print quality by jetting the ink in a Hewlett-Packard Deskjet 500 printer. Testing shows that the print quality of the ink jet ink composition is high, with the ink being fast drying, nonsmearing and waterfast.

Example 3

Preparation of a Magenta Colored Ink Jet Ink Composition

Following the same procedure and using the same equipment as in Example 2, a magenta ink jet ink composition is prepared. The same materials are used as in Example 2, except that the cyan pigment is substituted with 1 g of pre-dispersed Sunsperse Quindo Magenta QHD 6040 (40.0% solids, available from Sun Chemicals). Jetting of the ink composition in the Hewlett-Packard Deskjet 500 printer shows that the print quality of the ink jet ink composition is high, with the ink being fast drying, non-smearing and waterfast.

Example 4

Preparation of a Yellow Colored Ink Jet Ink Composition

Following the same procedure and using the same equipment as in Example 2, a yellow ink jet ink composition is prepared. The same materials are used as in Example 2, except that the cyan pigment is substituted with 1.5 g of pre-dispersed Sunsperse Yellow YHD 6001 (45.7% solids, available from Sun Chemicals). Jetting of the ink composition in the Hewlett-Packard Deskjet 500 printer shows that the print quality of the ink jet ink composition is high, with the ink being fast drying, non-smearing and waterfast.

Example 5

Preparation of a Black Colored Ink Jet Ink Composition

Following the same procedure and using the same equipment as in Example 2, a black ink jet ink composition is prepared. The same materials are used as in Example 2, except that the cyan pigment is substituted with 1.5 g of pre-dispersed Sunsperse Carbon Black LHD 9303 (48.5% solids, available from Sun Chemicals). Jetting of the ink composition in the Hewlett-Packard Deskjet 500 printer shows that the print quality of the ink jet ink composition is high, with the ink being fast drying, non-smearing and waterfast.

What is claimed is:

1. A method for forming an ink jet ink composition, comprising:
   (a) combining (1) an emulsion of an emulsifiable polymer resin in an anionic medium with (2) a pigment and a cationic surfactant;
   (b) aggregating particles in the mixture of step (a) to a desired particle size, thereby producing a dispersion of aggregated particles;
   (c) coalescing said aggregated particles, said coalescing step comprising heating said dispersion and one of (a) adding an anionic surfactant to said dispersion, (b) adding a pH controlling agent to said dispersion to yield a pH of from about 7 to about 10, and (c) using a homogenizer, wherein said aggregated particles are reduced to particles having an average particle size of less than one micron in said coalescing step; and
   (d) adjusting a surface tension and viscosity of said dispersion such that said surface tension of said dispersion is from about 20 to about 70 dynes/cm at 25° C. and said viscosity of said dispersion is from about 0.7 to about 15 cP at 25° C.

2. The method of claim 1, wherein said coalescing step comprises adding additional anionic surfactant to the dispersion of step (b) and heating the dispersion.

3. The method of claim 1, wherein said aggregated particles of step (b) have an average particle size of greater than one micron, and said aggregated particles are reduced to particles having an average particle size of less than one micron in said coalescing step.

4. The method of claim 1, further comprising using a microfluidizer to reduce said aggregated particles to an average particle size of less than one micron.

5. The method of claim 1, wherein said emulsion in step (a) is formed by polymerizing one or more monomers in an emulsion polymerization process.

6. The method of claim 1, wherein said anionic medium comprises an anionic surfactant.

7. The method of claim 1, wherein particles of said desired particle size have an average particle size of from about 5 nm to about 300 nm.

8. The method of claim 1, wherein said aggregating step (b) comprises heating said mixture at a temperature of from room temperature to about 100° C. for a period of time of from about 10 minutes to about 5 hours.

9. The method of claim 1, wherein said emulsifiable polymer resin is a toner resin.

10. The method of claim 1, wherein a base chain of said emulsifiable polymer resin is selected from the group consisting of polyamide, polyimide, polyacrylate, polymethacrylate, polystyrene, copolystyrenecopolyacrylate, copolystyrene-copolymethacrylate, polyester, and mixtures thereof.

11. The method of claim 1, wherein a base chain of said emulsifiable polymer resin comprises polyester having attached thereto at least one hydrophilic group.

12. The method of claim 11, wherein said hydrophilic group is selected from the group consisting of carboxylic acid alkali salts, phosphonate salts, ammonium halides, and alkali sulfonated groups.

13. The method of claim 1, further comprising adding at least one additive selected from the group consisting of humectants, biocides, buffering agents, anti-mold agents, pH adjustment agents, electric conductivity adjustment agents, chelating agents, anti-rusting agents and anti-cockle agents to said aggregated particles.

14. An ink jet ink composition produced by the process of claim 1.

15. A method for forming an ink jet ink composition, comprising:
   (a) combining (1) an emulsion of an emulsifiable polymer resin in an anionic medium with (2) a pigment and a cationic surfactant;
   (b) aggregating particles in the mixture of step (a) to a desired particle size, thereby producing a dispersion of aggregated particles;
   (c) coalescing said aggregated particles, said coalescing step comprising heating said dispersion and one of (a) adding an anionic surfactant to said dispersion, (b) adding a pH controlling agent to said dispersion to yield a pH of from about 7 to about 10, and (c) using a homogenizer, wherein said aggregated particles are reduced to particles having an average particle size of less than one micron in said coalescing step;
   (d) separating said aggregated particles from said dispersion; and
   (e) dispersing said aggregated particles in a liquid ink vehicle to form an ink composition, wherein said ink composition has a surface tension of from about 20 to about 70 dynes/cm at 25° C. and a viscosity of from about 0.7 to about 15 cP at 25° C.

* * * * *